Patented Feb. 22, 1938

2,109,337

UNITED STATES PATENT OFFICE 2,109,337

AMORPHOUS SILICA DRILLING FLUID

Owen Mayfield, Houston, Tex., assignor to Corona Products, Inc., Rogers, Ark., a corporation of Arkansas No Drawing. Application September 9, 1935, Serial No. 39,810

2 Claims. (Cl. 255—1)

This invention relates to amorphous silica drilling fluid.

Objects of the invention are to provide a drilling fluid comprising amorphous silica treated and conditioned so that, when used in oil and gas wells, it will not pack in oil sands because of the lower specific gravity and the fine mesh thereof; to provide a drilling fluid of this character and including as the principle constituent amorphous silica which will not become gas cut; to provide an improved amorphous silica drilling fluid that will hold up or sustain the walls of the bore holes in formations having a tendency or inclination to cave in or to heave; and to provide an amorphous silica drilling fluid of a friable nature finely ground so as to form a cohesive drilling fluid to aid substantially in the suspension of higher specific gravity solids.

Another object of the invention is to provide an improved amorphous silica drilling fluid having a water absorption capacity of approximately 50% more or less, whereby a fluid drilling substance with a low percentage of free water is obtained, thus adapting the fluid for satisfactory use in the so-called "heaving shale" formations. This is of great importance because it is known by experience that the so-called "heaving shale" formations generally have a real tendency to break down or disintegrate when coming in contact with free water; consequently, the use of this material in preventing such break down and disintegration is of great advantage. Since the water absorption capacity of the amorphous silica is about 50% more or less, an additional amount of water would separate from the silica and become "free water."

Another object of the invention is to provide an improved and superior amorphous silica fluid that may be used with great satisfaction in "washing" completed oil or gas wells. This is of importance because this type of fluid will dislodge these solids from the oil sands and suspend and remove them from the well.

Amorphous silica as used herein includes only silica that has no determinate form. In practice, after the silica has been removed from the mine in a crude state, it is passed through different stages of treatment until it is reduced in size to 99.5% that will pass through 325 mesh screen. This is much finer than any other substances that are applied to analogous uses with which I am familiar; and, due to the characteristics of the amorphous silica when conditioned in this manner, all of the intended objects and functions are successfully attained. The fact that the amorphous silica is reduced to this finely powdered condition is a great contributing factor in increasing the number of fine colloidal solids and in materially increasing the walling characteristics of the drilling fluid, as indicated in the statement of objects to be attained by this invention.

In instances in which the amorphous silica, when removed from the mine, does not contain clay, I prefer to add about 1% of clay of a soft friable nature being free from all sands and grit, etc., for the purpose of producing a uniform product. The clay which I use does not contain bentonite, which does not possess the required characteristics of resisting gas cutting.

During the process of grinding the amorphous silica, I add varying amounts of oxalic acid for the purpose of bleaching the silica to a lighter color, the amount of oxalic acid added depending upon the amount of discoloration in the crude amorphous silica.

This amorphous silica drilling fluid, prepared and conditioned in this way, is distinguished from all other substances applied to analogous uses with which I am familiar in the important particular that less frequent chemical treatment is required during drilling activities for the amorphous silica drilling fluid than is required for other substances to obtain like results. I attribute this to the fact that amorphous silica is a highly inert substance.

This amorphous silica drilling fluid, being highly inert, experiences no chemical reaction when encountered by salt water, thereby enabling amorphous silica to hold its weight or physical properties. Further, this drilling fluid possesses highly desirable wall forming qualities due to the extremely fine grinding and comparatively low specific gravity and to the fact that it is amorphous. As a consequence, when applied to the walls of the bore hole in formations that are inclined to cave, this tough impervious wall gives the hydrostatic pressure of the fluid column something to push against, thereby holding the caving formations in place.

When drilling into a salt water sand or salt water flow, the amorphous silica will build a tough impervious wall on this formation, allowing the fluid column pushing against the wall to exclude or hold the salt water out of the bore hole.

This amorphous silica drilling fluid may not properly be characterized as a high-weight material, but is more properly characterized as a semi-weight material and drilling mud conditioner in that it will increase the weights of the drilling fluids moderately due to its high water absorption.

This improved drilling fluid has been used successfully and subjected to most severe tests continuously for a sufficient time to establish the fact that it attains all of these objects and advantages, and is superior to and distinguished from other substances in the particulars indicated. It has been successfully applied to use in connection with known commercial substances in drilling fluids with great advantage in improving and increasing their performance under many conditions. This material aids in suspension of high gravity weight materials, and also improves the wall forming qualities of such fluids.

I claim:—

1. A drilling fluid comprising approximately 99% of amorphous silica divided finely to pass through a 325 mesh screen, and about 1% of clay of a soft friable nature and free from all sands and grit, said drilling fluid having an absorption capacity of about 50% of water.

2. A drilling fluid comprising about 99% of amorphous silica divided finely to pass through a 325 mesh screen, and about 1% of clay of a soft friable nature and free from all sands and grit, together with a sufficient amount of oxalic acid to bleach the silica, said drilling fluid having an absorption capacity of about 50% of water.

OWEN MAYFIELD.